(12) United States Patent
Lou (10) Patent No.: US 10,921,640 B2
(45) Date of Patent: Feb. 16, 2021

(54) BACKLIGHT MODULE AND PREPARING METHOD THEREOF, DISPLAY DEVICE

(71) Applicants: BEIJING BOE CHATANI ELECTRONICS CO., LTD., Beijing (CN); BOE TECHNOLOGY GROUP CO., LTD., Beijing (CN)

(72) Inventor: Tengfei Lou, Beijing (CN)

(73) Assignees: BEIJING BOE CHATANI ELECTRONICS CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/443,031

(22) Filed: Jun. 17, 2019

(65) Prior Publication Data

US 2020/0133065 A1    Apr. 30, 2020

(30) Foreign Application Priority Data

Oct. 30, 2018   (CN) ............................ 201217793146

(51) Int. Cl.
  *G02F 1/1333* (2006.01)
  *G02B 6/00* (2006.01)
  *G02F 1/13357* (2006.01)
  *F21V 8/00* (2006.01)

(52) U.S. Cl.
  CPC ..... *G02F 1/133602* (2013.01); *G02B 6/0095* (2013.01); *G02F 1/133308* (2013.01)

(58) Field of Classification Search
  CPC ......... G02F 1/133308; G02F 1/133608; G02F 1/133615; G02F 2202/28; G02F 2001/133325; G02F 1/133602; G02B 6/0088; G02B 6/0095
  See application file for complete search history.

(56) References Cited

U.S. PATENT DOCUMENTS

| | | | |
|---|---|---|---|
| 10,139,556 B1* | 11/2018 | Chen ............... | G02B 6/0088 |
| 10,386,572 B1* | 8/2019 | Wan ................ | G02B 6/0055 |
| 2001/0050731 A1* | 12/2001 | An .................. | G02B 6/0088 |
| | | | 349/58 |
| 2017/0059769 A1* | 3/2017 | Ma .................. | G02F 1/133308 |

* cited by examiner

*Primary Examiner* — Xuemei Zheng (57) ABSTRACT

A backlight module and a preparing method thereof, and a display device are provided. The backlight module includes a back plate, a light guide plate, and an optical film sheet. The back plate includes a bottom plate, the light guide plate is located inside the back plate, the optical film sheet is disposed on a side of the light guide plate away from the back plate and fixedly connected to the light guide plate, and an orthographic projection of the optical film sheet on a plane where the bottom plate is located is located in the bottom plate.

19 Claims, 4 Drawing Sheets

BACKLIGHT MODULE AND PREPARING METHOD THEREOF, DISPLAY DEVICE

The present application claims priority of the Chinese patent application No. 201821779314.6, filed on Oct. 30, 2018, the disclosure of which is incorporated herein by reference as part of the application.

TECHNICAL FIELD

At least one embodiment of the present disclosure relates to a backlight module and a preparing method thereof, and a display device.

BACKGROUND

With development of science and technology and advancement of society, electronic display products are more and more widely used in people's daily life. Correspondingly, people are increasingly demanding the performance of electronic display products, especially an appearance of the electronic display products.

Some electronic display products (for example, liquid crystal displays) require a backlight module to provide light for display. However, the current backlight module is limited to its own design structure, and there is a light leakage phenomenon, which adversely affects the appearance of the products, and it is difficult to meet the needs of users.

SUMMARY

At least one embodiment of the present disclosure provides a backlight module, the backlight module comprises a back plate, a light guide plate, and an optical film sheet. The back plate comprises a bottom plate, the light guide plate is located inside the back plate, the optical film sheet is disposed on a side of the light guide plate away from the back plate and fixedly connected to the light guide plate, and an orthographic projection of the optical film sheet on a plane where the bottom plate is located is located within the bottom plate.

For example, in a backlight module according to at least one embodiment of the present disclosure, the back plate further comprises a baffle plate, the baffle plate is disposed around the bottom plate to surround the light guide plate.

For example, in a backlight module according to at least one embodiment of the present disclosure, a distance from an end of the baffle plate away from the bottom plate to the plane where the bottom plate is located is larger than or equal to a distance from a surface of the optical film sheet away from the bottom plate to the plane where the bottom plate is located.

For example, in a backlight module according to at least one embodiment of the present disclosure, the baffle plate is located at an edge of the bottom plate, and the baffle plate and the bottom plate are configured to be an integral structure.

For example, a backlight module according to at least one embodiment of the present disclosure further comprises: a frame, connected to the back plate and including an extended portion from an outer side to an inner side of the light guide plate; wherein the optical film sheet and the light guide plate are located between the extended portion and the bottom plate.

For example, in a backlight module according to at least one embodiment of the present disclosure, an end of the baffle plate away from the bottom plate is seamlessly coupled to the extended portion.

For example, in a backlight module according to at least one embodiment of the present disclosure, the light guide plate comprises a light guide plate main body, the backlight module further comprises: a light source, disposed on a side surface of the light guide plate main body, the side surface being configured to be perpendicular to a light exiting surface of the light guide plate main body; wherein on a side of the light guide plate main body facing the light source, an edge of the light guide plate main body is located between an edge of the optical film sheet and the baffle plate.

For example, in a backlight module according to at least one embodiment of the present disclosure, on a side of the light guide plate main body which is opposite to a side of the light guide plate main body facing the light source, an edge of the optical film sheet is coincident with an edge of the light guide plate main body or located between an edge of the light guide plate main body and the baffle plate.

For example, in a backlight module according to at least one embodiment of the present disclosure, the light guide plate comprises a light guide plate main body and a protrusion disposed at an edge of a side of the light guide plate main body away from the back plate, and the light guide plate is in snap-fit connection with the optical film sheet by the protrusion.

For example, in a backlight module according to at least one embodiment of the present disclosure, the optical film sheet comprises a snap-fit structure, the snap-fit structure having a shape matching the protrusion to engage with the protrusion.

For example, in a backlight module according to at least one embodiment of the present disclosure, the snap-fit structure is a through hole, and the protrusion is in snap-fit connection with the through hole.

For example, in a backlight module according to at least one embodiment of the present disclosure, the snap-fit structure is a groove, and the protrusion is in snap-fit connection with in the groove.

For example, in a backlight module according to at least one embodiment of the present disclosure, the light guide plate main body is a rectangular parallelepiped structure, and the protrusion is located at a corner of the light guide plate main body.

For example, a backlight module according to at least one embodiment of the present disclosure further comprises: a light source, disposed on a side surface of the light guide plate main body, the side surface being configured to be perpendicular to a light exiting surface of the light guide plate main body; wherein the light guide plate comprises three protrusions, the three protrusions are respectively located at three corners of the light guide plate main body, and three snap-fit structures in a one-to-one correspondence relationship with the three protrusions are at edges of the optical film sheet, each of the three protrusions is in snap-fit connection with a corresponding one of the three snap-fit structures.

For example, in a backlight module according to at least one embodiment of the present disclosure, the three protrusions are respectively a first protrusion, a second protrusion and a third protrusion, the first protrusion and the second protrusion are respectively located at two corners of the light guide plate main body away from the light source, and the third protrusion is located at a corner of the light guide plate main body close to the light source.

For example, in a backlight module according to at least one embodiment of the present disclosure, an orthographic projection of the first protrusion on the plane where the bottom plate is located and an orthographic projection of the second protrusion on the plane where the bottom plate is located are in a L-shape, and an opening of the L-shape faces a centroid of the light guide plate main body; and/or the third protrusion is a columnar structure.

For example, in a backlight module according to at least one embodiment of the present disclosure, an orthographic projection of the protrusion on the plane where the bottom plate is located coincides with an orthographic projection of the snap-fit structure on the plane where the bottom plate is located or is located within the orthographic projection of the snap-fit structure on the plane where the bottom plate is located.

For example, in a backlight module according to at least one embodiment of the present disclosure, the light guide plate is bonded to the optical film sheet.

At least one embodiment of the present disclosure provides a display device, the display device comprises a display panel and the backlight module according to anyone of the above embodiment.

At least one embodiment of the present disclosure provides a method of preparing a backlight module, the method comprising: providing a back plate comprising a bottom plate; providing a light guide plate, installing the light guide plate into the back plate; and providing an optical film sheet, installing the optical film sheet on the light guide plate and on a side of the light guide plate away from the back plate; wherein an orthographic projection of the optical film sheet on a plane where the bottom plate is located is located in the bottom plate.

BRIEF DESCRIPTION OF THE DRAWINGS

In order to demonstrate clearly technical solutions of the embodiments of the present disclosure, the accompanying drawings in relevant embodiments of the present disclosure will be introduced briefly. It is apparent that the drawings may only relate to some embodiments of the disclosure and not intended to limit the present disclosure.

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is apparent that the described embodiments are just a part but not all of the embodiments of the disclosure. Based on the described embodiments herein, those skilled in the art may obtain other embodiment, without any creative work, which shall be within the scope of the disclosure.

Unless otherwise defined, all the technical and scientific terms used herein have the same meanings as commonly understood by one of ordinary skill in the art to which the present disclosure belongs. The terms, such as "first," "second," or the like, which are used in the description and the claims of the present disclosure, are not intended to indicate any sequence, amount or importance, but for distinguishing various components. The terms, such as "comprise/comprising," "comprise/comprising," or the like are intended to specify that the elements or the objects stated before these terms encompass the elements or the objects and equivalents thereof listed after these terms, but not preclude other elements or objects. The terms, such as "connect/connecting/connected," "couple/coupling/coupled" or the like, are not limited to a physical connection or mechanical connection, but may comprise an electrical connection/coupling, directly or indirectly. The terms, "on," "under," "left," "right," or the like are only used to indicate relative position relationship, and when the position of the object which is described is changed, the relative position relationship may be changed accordingly.

A backlight module is a light source assembly fixed to a back of a panel (for example, a liquid crystal display panel), and the backlight module may include an optical film sheet, a light guide plate, and a back plate. For example, the back plate may include a bottom plate and a baffle plate surrounding the bottom plate. For example, the light guide plate and the optical film sheet may be sequentially disposed on the bottom plate. The optical film sheet is provided with a convex lug (a portion of the optical film sheet extending outward in a plane direction thereof), the baffle plate is provided with a groove, and the convex lug may be in snap-fit connection with the groove of the baffle plate to be fixedly connected to the back plate. Since the convex lug of the optical film sheet is in snap-fit connection with the baffle plate of the back plate, there is a gap at the groove of the baffle plate, and a portion of the optical film sheet located in the groove also transmits light. Therefore, it is necessary to attach a light-shielding tape on the baffle plate to prevent the backlight module from leaking light at the groove. However, since the light-shielding tape needs to be attached to the baffle plate of the back plate, an assembly efficiency of the backlight module is low.

For example, in a process of assembling a backlight module, a back plate may be placed on a worktable, that is, a bottom plate of the back plate is in contact with the worktable. In order to effectively avoid the light leakage of the backlight module, in addition to the need to attach a light-shielding tape on a baffle plate of the back plate, it is also necessary to attach a light-shielding tape on the bottom plate of the back plate. In order to facilitate the attachment of the light-shielding tape on the bottom plate of the back plate, the bottom plate of the back plate and an optical film sheet need to be turned upside down such that the bottom plate is located a side of the back plate away from the worktable. However, after the bottom plate of the back plate and the optical film sheet are turned upside down, the optical film sheet may directly contact the table, and the optical film sheet is easily scratched during the assembling process, thereby a display effect of the display device is reduced. In addition, a thickness of the light-shielding tape is at least 0.1 mm (millimeter), or at least 0.15 mm, which affects an appearance of the backlight module and is not conducive to obtain a lighter and thinner backlight module.

At least one embodiment of the present disclosure relates to a backlight module and a preparing method thereof, and a display device. The backlight module includes a back plate, a light guide plate, and an optical film sheet. The back plate includes a bottom plate, the light guide plate is located in the back plate, the optical film sheet is disposed on a side of the light guide plate away from the back plate and fixedly connected to the light guide plate, and an orthographic projection of the optical film sheet on a plane where the bottom plate is located is located in the bottom plate. In the backlight module, since the optical film sheet can be fixedly connected to the light guide plate, it is not necessary to provide a structure such as a groove on the back plate (for example, the baffle plate described below) to fix the optical film sheet, it is not necessary to provide a structure such as a convex lug on the optical film sheet, thereby a problem of light leakage of the backlight module caused by engaging the convex lug of the optical film sheet with the baffle plate of the back plate can be avoided, thereby it is not necessary to attach the light-shielding tape on the baffle plate and the bottom plate of the back plate, such that an assembly efficiency of the backlight module is improved. In addition, since it is not necessary to attach the light-shielding tape on the bottom plate of the back plate, in the assembly process of the backlight module, it is not necessary to turn the backlight module upside down for attaching the light-shielding tape, thereby avoiding a situation that the optical film sheet is directly in contact with the worktable to scratch the optical film sheet, thereby ensuring a display effect of the display device, that is, a yield of the display device is improved.

Hereinafter, a backlight module and a display device according to at least one embodiment of the present disclosure are described with reference to accompanying drawings.

Figure 1:
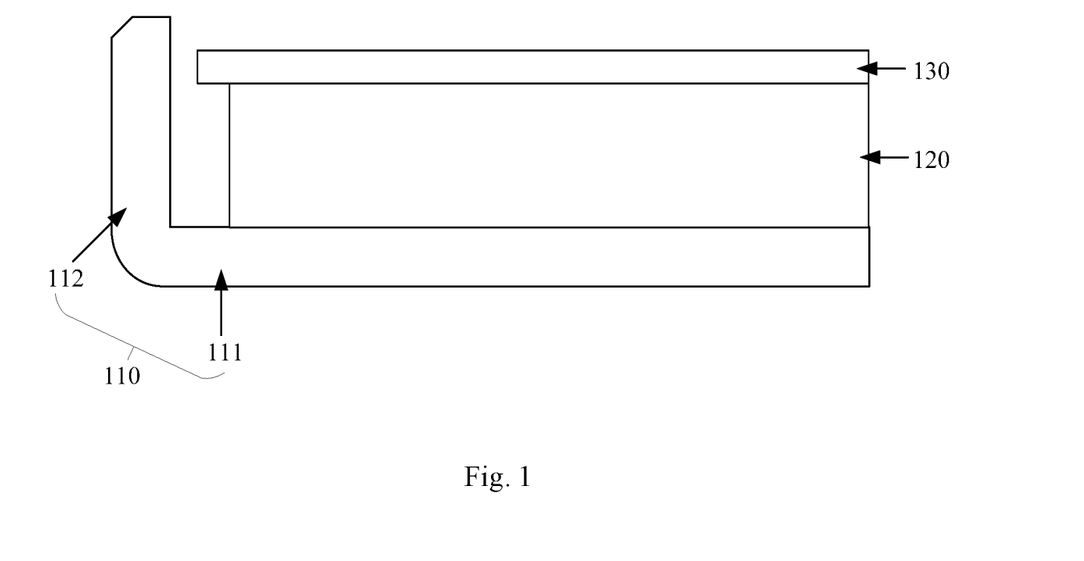
FIG. 1 is a partial structure view of a backlight module according to some embodiments of the present disclosure.

FIG. 1 is a partial structure view of a backlight module according to some embodiments of the present disclosure. In at least one embodiment of the present disclosure, as shown in FIG. 1, the backlight module may include a back plate 110, a light guide plate 120, and an optical film sheet 130. The light guide plate 120 is disposed in the back plate 110, and the optical film sheet 130 is disposed on a side of the light guide plate 120 away from the back plate 110, and the light guide plate 120 is fixedly connected to the optical film sheet 130. An orthographic projection of the optical film sheet 130 on a plane where the bottom plate 111 of the back plate 110 is located is located in the bottom plate 111.

Illustratively, as shown in FIG. 1, the back plate 110 may include a bottom plate 111 and a baffle plate 112 disposed around (for example, surrounding) the bottom plate 111. Thus, the bottom plate 111 and the baffle plate 112 may define a recess. The light guide plate 120 may be disposed on the bottom plate 111. For example, the baffle plate 112 surrounds the light guide plate 120, and thus, the light guide plate 120 is located in the recess defined by the bottom plate 111 and the baffle plate 112. For example, the bottom plate 111 and the baffle plate 112 may be configured to be an integral structure, or may be fixedly connected by welding, bonding, or the like. For example, the integral structure may refer to that the bottom plate 111 and the baffle plate 112 are formed by processing (for example, hot pressing, etc.) an integral member, and a joint between the bottom plate 111 and the baffle plate 112 does not have a physical interface and materials of the bottom plate 111 and the baffle plate 112 are the same.

Figure 2:
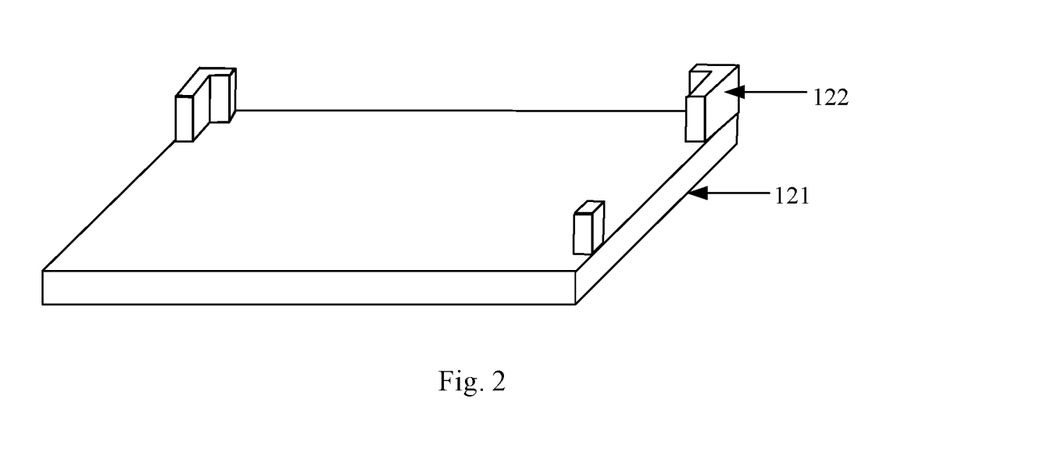
FIG. 2 is a structure view of a light guide plate according to some embodiments of the present disclosure.

FIG. 2 is a structure view of a light guide plate according to some embodiments of the present disclosure. Illustratively, as shown in FIG. 1 and FIG. 2, the light guide plate 120 may include a light guide plate main body 121, and a protrusion 122 disposed at an edge of the light guide plate main body 121 on a side thereof away from the back plate 110. The light guide plate 120 may be in snap-fit connection with the optical film sheet 130 through the protrusion 122 to be fixedly connected to the optical film sheet 130. The position of the optical film sheet 130 is not needed to be defined by the back plate 110 (for example, the baffle plate 112 of the back plate 110), that is, the groove of the back plate 110 (or its baffle plate 112) is not required to be provided for fixing the optical film sheet 130, such that a light leakage caused by setting the groove can be avoided.

For example, in a backlight module provided by at least one embodiment of the present disclosure, the light guide plate main body 121 and the protrusion 122 may be an integral structure, or may be fixedly connected by soldering, bonding, or the like. The protrusion 122 may be prisms such as triangular prisms, quadrangular prisms or other prisms, or the protrusion 122 may be cylindrical, or may be tapered structures such as cones, pyramids, or the like. The light guide plate main body 121 may be a plate-like structure, and may be, for example, a rectangular parallelepiped structure or the like. The embodiment of the present disclosure does not limit the structure of the protrusion 122 and the light guide plate main body 121, which may be designed according to actual needs.

In at least one embodiment of the present disclosure, a manner in which the light guide plate and the optical film sheet are in snap-fit connection is not limited. For example, the optical film sheet includes a snap-fit structure (such as a through hole 131 or a groove 132 in the embodiments below), the snap-fit structure has a shape matching the protrusion to engage with the protrusion. It should be noted that, in an embodiment of the present disclosure, a male snap-fit (for example, the protrusion 122 described above) may be disposed in the light guide plate, and a female snap-fit with a shape matching the shape of the male snap-fit may be disposed in the optical film sheet; alternatively, a female snap-fit may be disposed in the light guide plate, and a male snap-fit matching the shape of the female snap-fit may be disposed in the optical film sheet. For example, compared to the light guide plate, a thickness of the optical film sheet is generally thinner, and the optical film sheet may be a laminate of a plurality of functional film layers. If the male snap-fit is disposed on the light guide plate, a difficulty of processing the light guide plate and the optical film sheet can be reduced, thereby simplifying a manufacturing process and reducing the cost.

Figure 3:
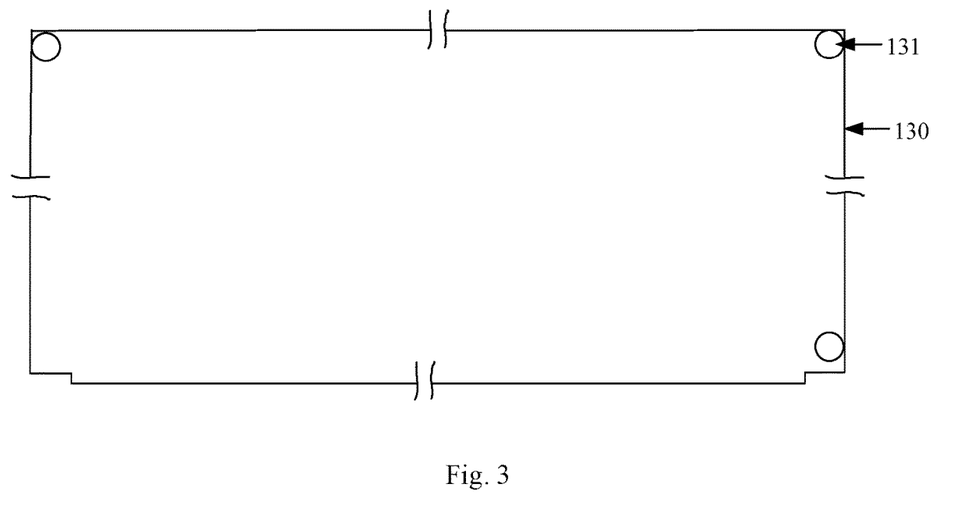
FIG. 3 is a top view of an optical film sheet provided according to some embodiments of the present disclosure.
Figure 4:
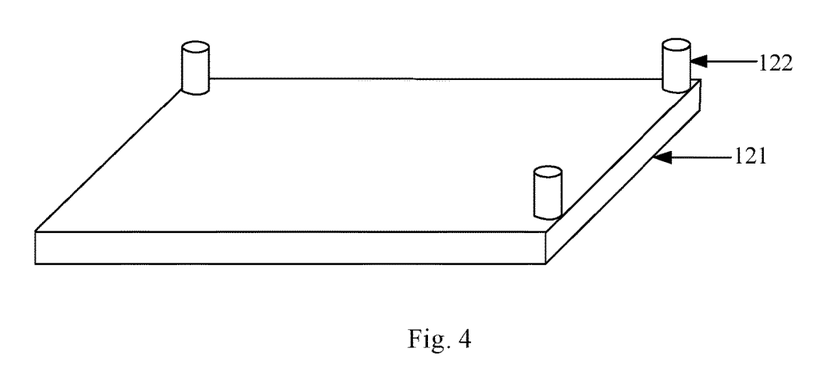
FIG. 4 is a structure view of another light guide plate according to some embodiments of the present disclosure.

For example, in a backlight module provided by at least one embodiment of the present disclosure, as shown in FIG. 3 and FIG. 4, a through hole 131 may be disposed at an edge of the optical film sheet 130. The through hole 131 can serve as the female snap-fit of the protrusion 122, such that the protrusion 122 may be in snap-fit connection with the through hole 131, so that the light guide plate 120 can be fixedly connected to the optical film sheet 130.

It should be noted that, in at least one embodiment of the present disclosure, the connecting manner of the light guide plate and the optical film sheet is not limited to the above-mentioned snap-fit connection. For example, a position limiting device (such as a holding member) may be installed on the light guide plate, and the position limiting device may be used to define a position of the optical film sheet, to install the optical film sheet on a side of the light guide plate away from the back plate (the bottom plate). For example, the position limiting device may replace the protrusion or cooperate with the protrusion. For example, the inside of the position limiting device may be coated with a glue layer to bond with the optical film sheet and the light guide plate, thereby fixing the optical film sheet on the light guide plate. For example, the position limiting device may be fixed to a side surface of the light guide plate by bonding. For example, the position limiting device may be disposed in a region corresponding to a corner of the light guide plate.

It should be noted that, in at least one embodiment of the present disclosure, in a case of describing the snap-fit connection, the "matching" of the shape may indicate that under the corresponding shape, the positions of the two sides may be defined with each other, and the shapes (for example, a planar shape) of the two sides may be the same or different. For example, in some embodiments of the present disclosure, as shown in FIG. 4, the protrusion 122 may be a cylinder, correspondingly, as shown in FIG. 3, the through hole 131 disposed at an edge of the optical film sheet 130 is a circular through hole, that is, an orthographic projection of each of the protrusion 122 and the through hole 131 on a plane where the light guide plate 120 is located is in a circular shape. For example, in other embodiments of the present disclosure, as shown in FIG. 4, the protrusion 122 may be a cylinder, a shape of the through hole 131 of the optical film sheet 130 shown in FIG. 3 may be deformed into a square shape, and a side length of the square shape may be equal to (or slightly larger than) a diameter of the cylinder, therefore, the light guide plate 120 may also be in snap-fit connection with the optical film sheet 130. For example, at least in a direction parallel to a plane on which the light guide plate 120 is located, the light guide plate 120 and the optical film sheet 130 do not move about each other.

Figure 5:
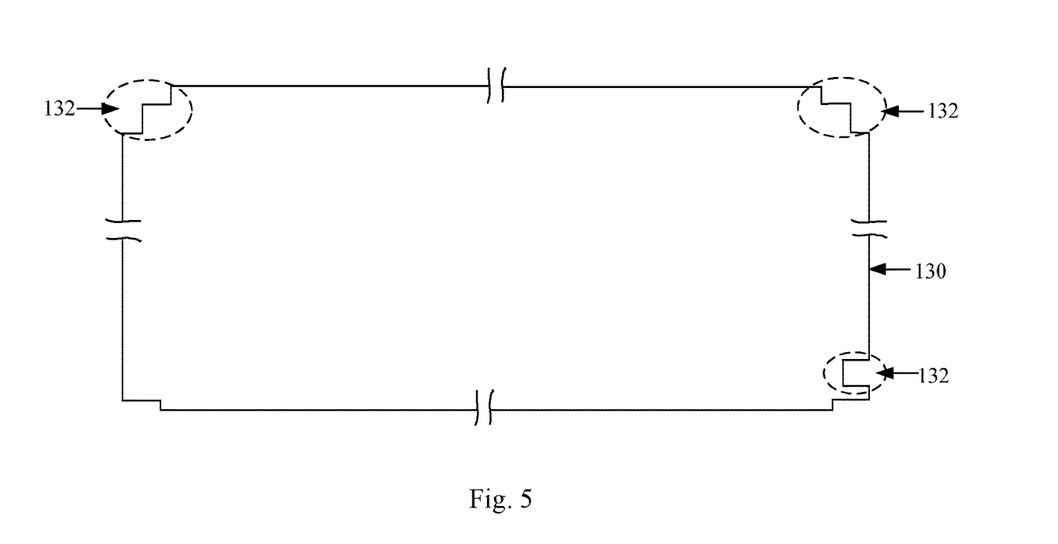
FIG. 5 is a top view of another optical film sheet provided according to some embodiments of the present disclosure.

For example, in a backlight module provided by at least one embodiment of the present disclosure, as shown in FIG. 2 and FIG. 5, a groove 132 may be disposed at an edge of the optical film sheet 130. The protrusion 122 may be in snap-fit connection with the groove 132, and the light guide plate 120 can be fixedly connected to the optical film sheet 130. For example, the groove 132 may be a notch, for example, a planar shape of the optical film sheet 130 as shown in FIG. 5 before being processed (for example, being cut) is substantially in a rectangular shape.

For example, in a backlight module provided by at least one embodiment of the present disclosure, as shown in FIG. 2, the protrusion 122 may be a prism such as a triangular prism, a quadrangular prism or other prisms, or may be a pyramid such as a triangular pyramid, a quadrangular pyramid, or the like. Correspondingly, as shown in FIG. 5, the groove 132 provided at the edge of the optical film sheet 130 may be in a shape of triangle, quadrangle or polygon matching a shape of a bottom surface of the prism. For example, the protrusion 122 may be a cylinder or a cone, and the groove 132 may be in a fan shape matching the shape of a bottom surface of the cone or the cylinder, that is, the groove 132 cause the edge shape of the optical film sheet 130 at this position to be in a circular arc shape.

Figure 6:
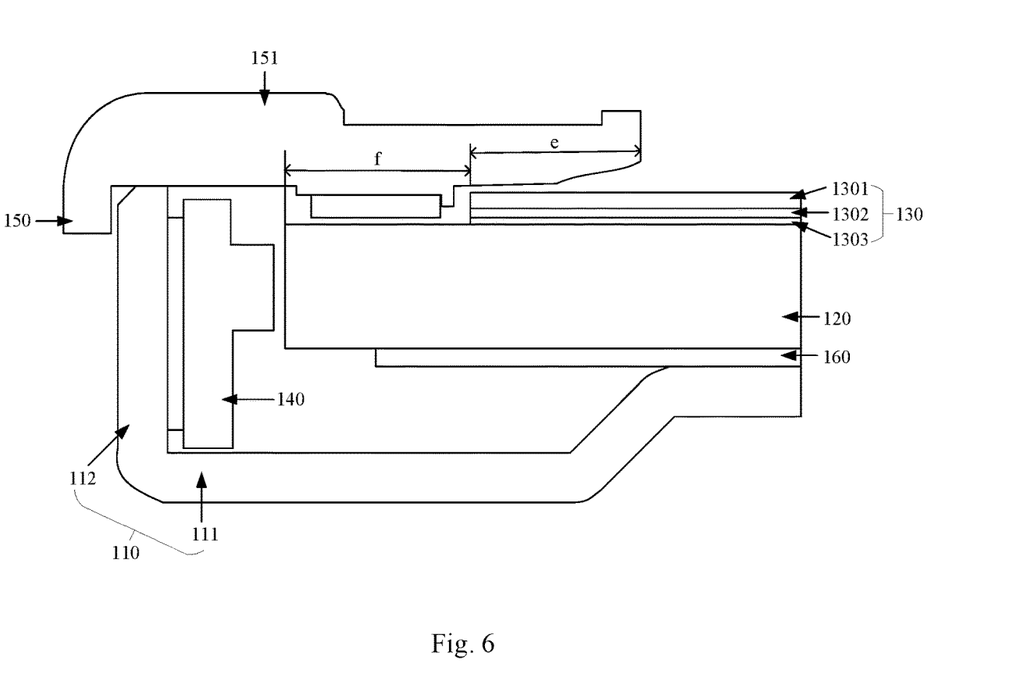
FIG. 6 is a structure view of a backlight module according to some embodiments of the present disclosure.

For example, in a backlight module provided by at least one embodiment of the present disclosure, as shown in FIG. 2 and FIG. 4, the light guide plate main body 121 may be configured to be a rectangular parallelepiped structure. FIG. 6 is a structure view of a backlight module according to some embodiments of the present disclosure. As shown in FIG. 6, the backlight module may further include a light source 140 disposed on a side surface of the light guide plate main body 121. For example, the light source 140 may be a light emitting diode or other type of light source. The side surface is perpendicular to a light exiting surface of the light guide plate main body 121, that is, the backlight module is an edge type backlight module. For example, the light exiting surface of the light guide plate main body 121 is a surface of the light guide plate main body 121 facing the optical film sheet 130. The edge type backlight module can reduce a thickness of the entire backlight module, and is beneficial to a thin and light design and appearance improvement of the backlight module and the display device.

In at least one embodiment of the present disclosure, the position of the snap-fit connection of the light guide plate and the optical film sheet and the number of the snap-fit connection are not limited. For example, the position of the snap-fit connection where the light guide plate and the optical film sheet are in snap-fit connection may be located at edges of the light guide plate and the optical film sheet, for example, further located at corners of the light guide plate and the optical film sheet as shown in FIG. 2, FIG. 3, FIG. 4, and FIG. 5, thereby reducing an influence of setting the snap-fit connection on a light exiting performance of the backlight module. It should be noted that the position of the snap-fit connection may be designed as needed, and it may not be limited to the above arrangement manner. For example, the number of the position for the snap-fit connection may be at least one, for example two, three or more.

Figure 7:
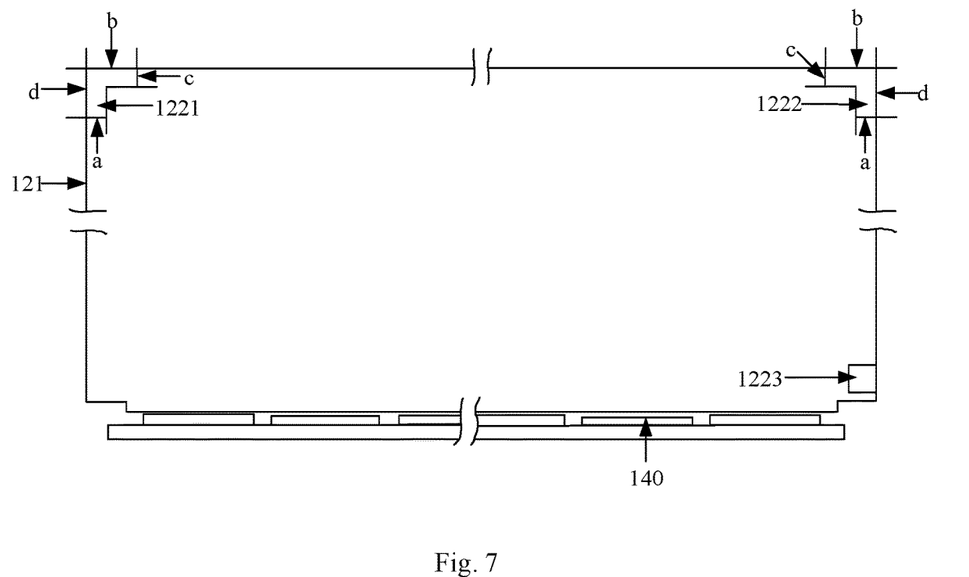
FIG. 7 is a top view of the light guide plate shown in FIG. 2.

FIG. 7 is a plan view of the light guide plate shown in FIG. 2. For example, in the backlight module provided by at least one embodiment of the present disclosure, as shown in FIG. 7, three protrusions 122 are disposed at edges of a side of the light guide plate main body 121 away from the back plate 110, and each of the protrusions 122 is located at a corner of the light guide plate main body 121, that is, three protrusions 122 are respectively located at three corners of the light guide plate main body 121. In the three protrusions 122, a first protrusion 1221 and a second protrusion 1222 are respectively located at two corners of the light guide plate main body 121 away from the light source 140, and a third protrusion 1223 is located at a corner of the light guide plate main body 121 close to the light source 140. Thus, there are three snap-fit connection positions between the light guide plate 120 and the optical film sheet 130, and in any direction parallel to a plane on which the light guide plate 120 is located, the light guide plate 120 and the optical film sheet 130 do not move relative to each other, the number of the positions of the snap-fit connection is decreased, thereby a design of the backlight module is simplified, and a manufacturing process difficulty and cost of the backlight module are reduced.

For example, as shown in FIG. 5, three grooves 132 corresponding to the three protrusions 122 may be disposed at edges of the optical film sheet 130, and each of the protrusions 122 may be in snap-fit connection with a corresponding one of the grooves 132. For example, as shown in FIG. 7, each of an orthographic projection of the first protrusion 1221 on the bottom plate and an orthographic projection of the second protrusion 1222 on the bottom plate is in L-shape, and an opening of the L-shape faces a centroid (not shown) of the light guide plate main body 121. For example, a planar shape of the light guide plate main body 121 is a rectangle, and the centroid may be a center of the rectangle. Each of the first protrusion 1221 and the second protrusion 1222 may include a first columnar structure and a second columnar structure that are perpendicular to a plane on which the light guide plate main body 121 is located, and each of an orthographic projection of the first columnar structure on the bottom plate 111 and an orthographic projection of the second columnar structure on the bottom plate 111 is in L-shape, and an opening of the L-shape (for example, a right-angle portion of the L-shape) faces a center of the light guide plate main body 121, the L-shape is located away from the center of the light guide plate main body 121, and two sides of the L-shape perpendicular to each other may be respectively consistent with two side edges of the light guide plate main body 121.

For example, in a backlight module provided by at least one embodiment of the present disclosure, a third protrusion 1223 may be a columnar structure such as a cylinder or a straight columnar, and the columnar structure extends in a direction perpendicular to a side surface of the light guide plate main body 121 facing a light source. An orthographic projection of the third protrusion 1223 on the bottom plate may be in a shape of triangular, square, rectangular, polygonal or circular. For example, the orthographic projection of the third protrusion 1223 on the bottom plate 111 is a in a shape of rectangle, and the extending direction of the rectangle is perpendicular to a side surface of the light guide plate main body 121. Since the third protrusion 1223 is located at a corner of the light guide plate main body 121 close to the light source 140, the columnar structure disposed to have an extending direction perpendicular to a side surface (the side surface facing the light source 140) of the light guide plate main body 121 can avoid blocking the light emitted by the light source 140, thereby ensuring a display effect of the display device.

For example, in a backlight module provided by at least one embodiment of the present disclosure, each of the three protrusions is a columnar structure such as a cylinder or a straight columnar. For an arrangement of the protrusion in a shape of the straight columnar may refer to the related description of the third protrusion 1223 in the embodiments shown in FIG. 7, which will not be described herein.

For example, in at least one embodiment of the present disclosure, as shown in FIG. 7, each of orthographic projections of the first protrusion 1221 and the second protrusion 1222 on the bottom plate may include a first side a, a second side b, and a third side c and a fourth side d. For a side surface of the light guide plate main body 121 facing the light source 140, the first side a and the second side b are parallel to the side surface of the light guide plate main body 121, and the first side a is close to the light source 140 with respect to the second side b. Each of the third side c and the fourth side d is perpendicular to the side surface of the light guide plate main body 121, and the third side c is close to a center of the light guide plate main body 121 with respect to the fourth side d.

For example, in at least one embodiment of the present disclosure, the backlight module may further include a frame, the frame may be connected to the back plate and includes an extended portion from an outer side to an inner side of the light guide plate, the optical film sheet and the light guide plate are located between the extended portion and the bottom plate. In this way, the frame and the bottom plate cooperate to sandwich the light guide plate and the optical film sheet in the back plate.

Figure 8:
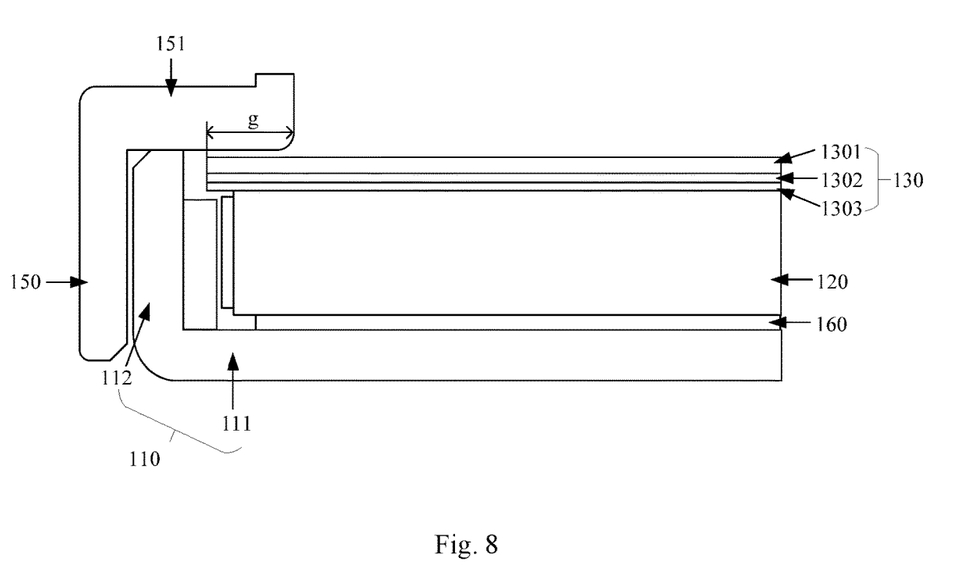
FIG. 8 is a structure view of another backlight module according to some embodiments of the present disclosure.

FIG. 8 is a structure view of a backlight module according to some embodiments of the present disclosure. For example, in at least one embodiment of the present disclosure, as shown in FIG. 6 and FIG. 8, the backlight module may further include a frame 150. For example, the frame 150 may be a hollow frame, and an inner side of the frame 150 is provided with an extended portion such as a support table 151. A plate surface of the support table 151 is parallel to an optical film sheet 130 and located on a side of the optical film sheet 130 away from the back plate 110 (a bottom plate 111 therein), and the support table 151 is in contact with the baffle plate 112 of the back plate 110. The support table 151 and the frame 150 may be configured to be an integral structure, or may be fixedly connected by welding, bonding, or the like.

For example, in at least one embodiment of the present disclosure, an inner side of a frame 150 may be provided with four support tables 151, the four support tables 151 are respectively located around an optical film sheet 130. In the four support tables 151, an extending direction of each of plate faces of two support tables 151 oppositely disposed is parallel to a side surface of a light guide plate main body 121 facing a light source 140, and an extending direction of each of plate faces of the other two support tables 151 oppositely disposed is perpendicular to the side surface of the light guide plate main body 121 facing the light source 140. In the two support tables 151 parallel to the side surface of the light guide plate main body 121 facing the light source 140, a support table 151 is located on a side of the optical film sheet 130 close to the light source 140, and another support table 151 is located on a side of the optical film sheet 130 away from the light source 140. For example, the four support tables 151 can be joined end to end after installation to form a rectangular frame.

For example, in at least one embodiment of the present disclosure, on a side of the light guide plate main body facing a light source, an edge of the light guide plate main body is located between an edge of the optical film sheet and the baffle plate. In this way, on the side of the light guide plate main body facing the light source, a portion of the light guide plate can be covered by an extended portion of the frame such as a support table and not covered by the optical film sheet, and this design prevents the optical film sheet and the like from affecting a light exiting. Illustratively, as shown in FIG. 6, a width e of a portion of the support table 151 located on a side of the optical film sheet 130 close to the light source 140 for covering the optical film sheet 130 may be not less than 2.45 mm and not more than 2.9 mm, that is, 2.45 mm≤e≤2.9 mm, and the support table 151 located on a side of the optical film sheet 130 close to the light source 140 covers the light guide plate main body 121, a width f of a portion of the support table 151 not covering the optical film sheet 130 is not less than 2.85 mm, and is not more than 3.1 mm, that is, 2.85 mm≤f≤3.1 mm. A direction of the width is perpendicular to the side surface of the light guide plate main body 121 facing the light source 140.

For example, in at least one embodiment of the present disclosure, on a side of the light guide plate main body which is not facing the light source, an edge of the optical film sheet coincides with an edge of the light guide plate main body or between the edge of the light guide plate main body and the baffle plate. Illustratively, as shown in FIG. 8, a width g of a portion of the support film 151 located on a side of an optical film sheet 130 away from a light source 140 covering the optical film sheet 130 is not less than 0.85 mm, and is not more than 1 mm, that is, 0.85 mm≤g≤1 mm. A direction of the width is perpendicular to a side surface of the light guide plate main body 121, and the side surface is opposite to and parallel to a side surface of the light guide plate main body 121 facing the light source 140.

For example, in at least one embodiment of the present disclosure, an extending direction of a plate surface is perpendicular to the side surface of the light guide plate main body 121 facing the light source 140. A width h (not shown) of portions of two support tables 151 covering the optical film sheet 130 is not less than 0.95 mm and not more than 1.2 mm, that is, 0.95 mm≤h≤1.2 mm. A direction of the width is parallel to the side surface of the light guide plate main body 121 facing the light source 140.

In at least one embodiment of the present disclosure, as shown in FIG. 8, after an optical film sheet 130 is fixedly connected to an light guide plate 120, the optical film sheet 130 is not clamped to a back plate 110 by a convex lug, thereby the frame 150 can be seamlessly connected to the back plate 110, that is, one end of the baffle plate 112 away from the bottom plate 111 is seamlessly connected to an extended portion (for example, the support table 151 of the frame 150), thereby light leakage of the backlight module can be prevented.

In at least one embodiment of the present disclosure, dimensions of the first protrusion 1221, the second protrusion 1222 and the third protrusion 1223 may be designed according to parameters such as the width e, the width f, the width g, the width h and the like above-mentioned, to ensure that the light guide plate 120 can effectively emit light and does not affect a display picture of a display device. It should be noted that the width e, the width f, the width g, the width h and the like above-mentioned are not limited to the numerical ranges given in the above embodiments, or can be designed according to specific needs.

For example, in at least one embodiment of the present disclosure, as shown in FIG. 7, a length of a first side a of an orthographic projection of the first protrusion 1221 and the second protrusion 1222 on a plane on which the bottom plate 111 is located may be not less than 0.4 mm, and is not more than 0.7 mm, that is, 0.4 mm≤a≤0.7 mm; a length of a second side b is not less than the length of the first side a, and is not more than 1.5 mm, that is, a≤b≤1.5 mm; a length of a third side c is not less than 0.4 mm, and is not more than 0.6 mm, that is, 0.4 mm≤c≤0.6 mm; and a length of a fourth side d is not less than the length of the third side c and is not more than 1.5 mm, that is, c≤d≤1.5 mm. In a case where an orthographic projection of the third protrusion 1223 on the bottom plate is in a square shape, a side length of the square may be not less than 0.4 mm and not more than 0.7 mm.

It should be noted that, in at least one embodiment of the present disclosure, shapes of the three protrusions 122 may also be the same. In addition, four protrusions 122 may be disposed at edges of the light guide plate main body 121. The number and shape of the protrusions disposed on the light guide plate main body 121 are not limited in at least one embodiment of the present disclosure.

For example, in a backlight module provided by at least one embodiment of the present disclosure, an orthographic projection of the protrusion 122 on a plane on which a bottom plate 111 of the back plate 110 is located is located within an orthographic projection of the groove 132 on a plane on which the bottom plate 111 is located, that is, a size of the orthographic projection of each of the grooves 132 on the plane on which a bottom plate 111 of the back plate 110 is located is not less than (for example, greater than) a size of the orthographic projection of the corresponding protrusion 122 on a plane on which the bottom plate 111 is located, since the optical film sheet 130 may expand at a high temperature, in this case that the size of the orthographic projection of each of the grooves 132 on a plane on which the bottom plate 111 of the back plate 110 is larger than the size of the orthographic projection of the corresponding protrusion 122 on the plane on which the bottom plate 111 is located, the stability of a fixation between the optical film sheet 130 and the light guide plate 120 can be ensured. Optionally, compared to a side length of the orthographic projection of each of the projections 122 on a plane on which a bottom plate 111 of the back plate 110 is located, a side length of the orthographic projection of each of the grooves 132 on a plane on which a bottom plate 111 of the back plate 110 is located increases by 0.1 mm or 0.15 mm.

For example, in a backlight module provided by at least one embodiment of the present disclosure, the orthographic projection of the protrusion 122 on a plane on which a bottom plate 111 of the back plate 110 is located is located within the orthographic projection of the through hole 131 on a plane on which the bottom plate 111 is located, that is, a size of the orthographic projection of each of the through holes 131 on the plane on which the bottom plate 111 of the back plate 110 is located is larger than a size of an orthographic projection of the corresponding protrusion 122 on a plane on which the bottom plate 111 is located. For example, a relationship of the sizes may be that shapes of the two projections are similar, and the sizes of the two projections are different, and the like.

For example, in a backlight device provided by at least one embodiment of the present disclosure, the light guide plate 120 may be adhesively fixed to an optical film sheet 130 by a glue. The glue may be optically clear resin (OCR) or optically clear adhesive (OCA). The light guide plate 120 is bonded to the optical film sheet 130 by using a transparent glue, thus, light transmitted through the light guide plate can be avoided to be blocking, thereby ensuring a display effect of a display device.

For example, in a backlight device provided by at least one embodiment of the present disclosure, in a case where the light guide plate 120 is clamped with the optical film sheet 130 by the protrusion 122, the light guide plate 120 may also be bonded to the optical film sheet 130 by the glue, thereby the stability of a fixation between the optical film sheet 130 and the light guide plate 120 can be improved.

For example, in a backlight device provided by at least one embodiment of the present disclosure, as shown in FIG. 6 and FIG. 8, the backlight module may further include a reflective sheet 160 disposed on a side of the light guide plate 120 close to the bottom plate 111 of the back plate 110.

For example, in at least one embodiment of the present disclosure, an optical adhesive layer (for example, material of the optical adhesive layer is the gel above-mentioned) may be disposed between the light guide plate 120 and the bottom plate 111 of the back plate 110 to replace the reflective sheet 160. For example, the light emitted by the light source 140 may be adjusted to be a parallel light beam to be incident into the light guide plate 120 at a certain angle, a refractive index of the optical adhesive layer is smaller than a refractive index of the light guide plate 120, such that the light in the light guide plate satisfies a total reflection condition at an interface between the light guide plate and the optical adhesive layer. In addition, the optical adhesive layer may adhere the light guide plate 120 to the bottom plate 111 of the back plate 110, thereby the stability of a fixation between the optical film sheet 130 and the light guide plate 120 can be improved. For example, a surface of the light guide plate 120 facing the bottom plate 111 may be provided with a plurality of net points, such that light rays being incident on the net points may be led out from the surface of the light guide plate 120 away from the bottom plate 111.

For example, materials of the light guide plate may include glass, polymethyl methacrylate, methyl methacrylate-styrene copolymer or other materials.

For example, in at least one embodiment of the present disclosure, as shown in FIG. 6 and FIG. 8, an optical film sheet 130 may include an upper diffusion sheet 1301, a prism sheet 1302, and a lower diffusion sheet 1303. The lower diffusion sheet 1303 is disposed on a side of the light guide plate 120 away from the back plate 110, the upper diffusion sheet 1301 is disposed on a side of the lower diffusion sheet 1303 away from the back plate 110, and the prism sheet 1302 is disposed between the upper diffusion sheet 1301 and the lower diffusion sheet 1303. Grooves are provided on sides of the upper diffusion sheet 1301, the prism sheet 1302, and the lower diffusion sheet 1303, and the grooves on the sides of the upper diffusion sheet 1301, the prism sheet 1302, and the lower diffusion sheet 1303 are in communication. The upper diffusion sheet 1301, the prism sheet 1302, and the lower diffusion sheet 1303 can make the light emitted from a light exiting surface of the light guide plate 120 uniform and tend to be collimated, thereby a brightness and a contrast of the displayed image can be improved.

At least one embodiment of the present disclosure relates to a backlight module, a light guide plate of the backlight module is located inside a back plate, an optical film sheet of the backlight module is disposed on a side of the light guide plate away from the back plate and fixedly connected to the light guide plate, and an orthographic projection of the optical film sheet on a plane where the bottom plate is located is located in the bottom plate. Since the optical film sheet may be fixedly connected to the light guide plate, it is not necessary to provide a structure such as a groove on the battle plate of the back plate to fix the optical film sheet, thereby a problem of light leakage of the backlight module caused by engaging a convex lug of the optical film sheet with the baffle plate of the back plate can be avoided, thereby it is not necessary to attach the light-shielding tape on the baffle plate and the bottom plate of the back plate, such that an assembly efficiency of the backlight module is improved. In addition, since it is not necessary to attach the light-shielding tape on the bottom plate of the back plate, a situation that the optical film sheet is directly in contact with the worktable to scratch the optical film sheet can be avoided, thereby ensuring a display effect of the display device.

At least one embodiment of the present disclosure provides a display device, which may include a display panel and a backlight module. A structure of the backlight module may refer to the related description of the embodiments shown in FIG. 1, FIG. 6 or FIG. 8, which will not be described herein.

For example, the display device may be any product or component having a display function such as a liquid crystal panel, an electronic paper, a mobile phone, a tablet computer, a television, a display, a notebook computer, a digital photo frame, a navigator, or the like.

At least one embodiment of the present disclosure provides a method of manufacturing a backlight module, the method may include: providing a back plate including a bottom plate; providing a light guide plate, installing the light guide plate into the back plate; and providing an optical film sheet, installing the optical film sheet on the light guide plate and on a side of the light guide plate away from the back plate; wherein an orthographic projection of the optical film sheet on a plane where the bottom plate is located is located in the bottom plate. In the backlight module obtained by the method above, since the optical film sheet may be fixedly connected to the light guide plate, it is not necessary to provide a structure such as a groove on the back plate (for example, the baffle plate described above) to fix the optical film sheet, it is not necessary to provide a structure such as a convex lug on the optical film sheet, thereby a problem of light leakage of the backlight module caused by engaging a convex lug of the optical film sheet with the baffle plate of the back plate can be avoided, thereby it is not necessary to attach the light-shielding tape on the baffle plate and the bottom plate of the back plate, such that an assembly efficiency of the backlight module is improved. In addition, since it is not necessary to attach the light-shielding tape on the bottom plate of the back plate, in the assembly process of the backlight module, it is not necessary to turn the backlight module upside down for attaching the light-shielding tape, thereby avoiding a situation that the optical film sheet is directly in contact with the worktable to scratch the optical film sheet, thereby ensuring a display effect of the display device, that is, a yield of the display device is improved. The structure of the backlight module obtained by the method above may refer to the related description in the embodiments above-mentioned, which will not be described herein.

For example, in one example of the present disclosure, a method of manufacturing a backlight module may include the following steps.

A step S1: forming a back plate including a bottom plate. For example, the back plate may also include a baffle plate formed at an edge of the bottom plate. Then, a structure such as a light source is installed in the back plate.

A step S2: forming a light guide plate. For example, a base material may be processed to form the light guide plate, the light guide plate includes a light guide plate main body and a protrusion disposed on one surface of the light guide plate main body. The structure of the light guide plate may refer to the related description in the embodiments above-mentioned, which will not be described herein.

A step S3: placing the light guide plate into the back plate, for example, placing the light guide plate on the bottom plate.

A step S4: providing an optical film sheet, processing (for example, cutting) the optical film sheet to form a groove or a through hole at an edge of the optical film sheet. A structure of the optical film sheet may refer to the related description in the foregoing embodiment, which will not be described herein.

Step S5: placing the optical film sheet on the light guide plate, and allowing the protrusion of the light guide plate to be in snap-fit connection with the groove or the through hole of the optical film sheet. For example, before the light guide plate is in snap-fit connection with the optical film sheet, an adhesive layer such as a glue may be formed on the light guide plate, in this way, the light guide plate and the optical film sheet may be fixed by bonding and snap-fit connection.

It should be noted that the step S5 may be performed first, and then the step S3 is executed.

A step S6: providing a frame such that the frame is connected (for example, clamped) to the back plate (for example, its baffle plate), for example, providing a frame such that the frame is in snap-fit connection with the back plate. The specific structure of the frame and the position of the frame in the backlight module may refer to the related description in the embodiments above-mentioned, which will not be described herein.

For the present disclosure, the following points should be noted:

(1) The accompanying drawings involve only the structure(s) in connection with the embodiment(s) of the present disclosure, and other structure(s) can be referred to common design(s).

(2) For the purpose of clarity only, in accompanying drawings for illustrating the embodiment(s) of the present disclosure, the thickness and size of a layer or a structure may be enlarged. However, it should understood that, in the case in which a component or element such as a layer, film, area, substrate or the like is referred to be "on" or "under" another component or element, it may be directly on or under the another component or element or a component or element is interposed therebetween.

(3) In case of no conflict, features in one embodiment or in different embodiments can be combined to obtain new embodiments.

The foregoing are merely specific embodiments of the invention, but not limitative to the protection scope of the invention. Within the technical scope disclosed by the present disclosure, any alternations or replacements which can be readily envisaged by one skilled in the art shall be within the protection scope of the present disclosure. Therefore, the protection scope of the invention shall be defined by the accompanying claims.

What is claimed is:

1. A backlight module, comprising:
   a back plate, comprising a bottom plate;
   a light guide plate, located inside the back plate; and
   an optical film sheet, disposed on a side of the light guide plate away from the back plate and fixedly connected to the light guide plate;
   wherein an orthographic projection of the optical film sheet on a plane where the bottom plate is located is located within the bottom plate;
   the light guide plate comprises a light guide plate main body and three protrusions on a surface of the light guide plate main body away from the back plate;
   the light guide plate main body comprises three corners, and the three protrusions are respectively located at the three corners of the light guide plate main body.

2. The backlight module according to claim 1, wherein the back plate further comprises a baffle plate, the baffle plate is disposed around the bottom plate to surround the light guide plate.

3. The backlight module according to claim 2, wherein a distance from an end of the baffle plate away from the bottom plate to the plane where the bottom plate is located is larger than or equal to a distance from a surface of the optical film sheet away from the bottom plate to the plane where the bottom plate is located.

4. The backlight module according to claim 2, wherein the baffle plate is located at an edge of the bottom plate, and the baffle plate and the bottom plate are configured to be an integral structure.

5. The backlight module according to claim 2, further comprising:
   a frame, coupled to the back plate and comprising an extended portion from an outer side to an inner side of the light guide plate;
   wherein the optical film sheet and the light guide plate are located between the extended portion and the bottom plate.

6. The backlight module according to claim 5, wherein an end of the baffle plate away from the bottom plate is seamlessly coupled to the extended portion.

7. The backlight module according to claim 5, wherein the backlight module further comprises:
   a light source, disposed on a side surface of the light guide plate main body, the side surface being configured to be perpendicular to a light exiting surface of the light guide plate main body;
   wherein on a side of the light guide plate main body facing the light source, an edge of the light guide plate main body is located between an edge of the optical film sheet and the baffle plate.

8. The backlight module according to claim 7, wherein on a side of the light guide plate main body which is opposite to a side of the light guide plate main body facing the light source, an edge of the optical film sheet is coincident with an edge of the light guide plate main body or located between an edge of the light guide plate main body and the baffle plate.

9. The backlight module according to claim 1, wherein the light guide plate is in snap-fit connection with the optical film sheet by the three protrusions.

10. The backlight module according to claim 9, wherein the optical film sheet comprises three snap-fit structures, the three protrusions are in a one-to-one correspondence relationship with the three snap-fit structures, and each of the three snap-fit structures has a shape matching a corresponding one of the three protrusions to engage with the three protrusions.

11. The backlight module according to claim 10, wherein the snap-fit structures are three through holes at edges of the optical film sheet, and each of the three protrusions is in snap-fit connection with a corresponding one of the three through holes.

12. The backlight module according to claim 10, wherein the snap-fit structures are three grooves, and each of the three protrusions is in snap-fit connection with a corresponding one of the three grooves.

13. The backlight module according to claim 10, wherein the light guide plate main body is a rectangular parallelepiped structure.

14. The backlight module according to claim 10, wherein an orthographic projection of each of the three protrusions on the plane where the bottom plate is located coincides with an orthographic projection of the corresponding one of the three snap-fit structures on the plane where the bottom plate is located or is located within the orthographic projection of the corresponding one of the snap-fit structures on the plane where the bottom plate is located.

15. The backlight module according to claim 1, wherein the light guide plate is bonded to the optical film sheet.

16. A display device, comprising a display panel and the backlight module according to claim 1.

17. A backlight module, comprising:
   a back plate, comprising a bottom plate;
   a light guide plate, located inside the back plate; and
   an optical film sheet, disposed on a side of the light guide plate away from the back plate and fixedly connected to the light guide plate;
   wherein an orthographic projection of the optical film sheet on a plane where the bottom plate is located is located within the bottom plate;
   the light guide plate comprises a light guide plate main body and a protrusion disposed at an edge of a side of the light guide plate main body away from the back plate, and
   the light guide plate is in snap-fit connection with the optical film sheet by the protrusion;
   the optical film sheet comprises a snap-fit structure, the snap-fit structure having a shape matching the protrusion to engage with the protrusion;
   the light guide plate main body is a rectangular parallelepiped structure, and
   the protrusion is located at a corner of the light guide plate main body;

the backlight module further comprises:
- a light source, disposed on a side surface of the light guide plate main body, the side surface being configured to be perpendicular to a light exiting surface of the light guide plate main body;
- wherein the light guide plate comprises three protrusions, the three protrusions are respectively located at three corners of the light guide plate main body, and
- three snap-fit structures in a one-to-one correspondence relationship with the three protrusions are at edges of the optical film sheet, each of the three protrusions is in snap-fit connection with a corresponding one of the three snap-fit structures.

18. The backlight module according to claim 17, wherein the three protrusions are respectively a first protrusion, a second protrusion and a third protrusion, the first protrusion and the second protrusion are respectively located at two corners of the light guide plate main body away from the light source, and the third protrusion is located at a corner of the light guide plate main body close to the light source.

19. The backlight module according to claim 18, wherein an orthographic projection of the first protrusion on the plane where the bottom plate is located and an orthographic projection of the second protrusion on the plane where the bottom plate is located are in a L-shape, and an opening of the L-shape faces a centroid of the light guide plate main body; and/or
the third protrusion is a columnar structure.

* * * * *

UNITED STATES PATENT AND TRADEMARK OFFICE
CERTIFICATE OF CORRECTION

Page 1 of 1

PATENT NO. : 10,921,640 B2
APPLICATION NO. : 16/443031
DATED : February 16, 2021
INVENTOR(S) : Tengfei Lou It is certified that error appears in the above-identified patent and that said Letters Patent is hereby corrected as shown below:

On the Title Page

Item (30) Foreign Application Priority Data:
Oct. 30, 2018 (CN)...................... 20121779314.6

Is changed to:
Oct. 30, 2018 (CN).....................201821779314.6

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*